United States Patent Office 3,505,333
Patented Apr. 7, 1970

3,505,333
INDAZO[2,3-c]QUINAZOLINE-11-SULFONAMIDES AND THEIR PREPARATION
Stanley C. Bell, Narberth, Pa., assignor to American Home Products Corporation, New York, N.Y., a corporation of Delaware
No Drawing. Continuation-in-part of application Ser. No. 614,793, Feb. 9, 1967. This application Feb. 12, 1968, Ser. No. 704,575
Int. Cl. C07d 57/16, 49/18; A61k 27/00
U.S. Cl. 260—256.5       10 Claims

ABSTRACT OF THE DISCLOSURE

This invention is concerned with indazolo[2,3-c]quinazoline-11-sulfonamides which are pharmacologically efficacious as anti-inflammatory agents. Further, this invention is concerned with the preparation of some of these indazolo[2,3-c]quinazolines, in particular, the 6-unsubstituted compounds, by the interaction of a 3-(2-aminophenyl)sulfamoylindazole with formic acid. Still further, this invention is concerned with the preparation of other of these indazolo[2,3-c]quinazoline, in particular, the 6-substituted compounds by the cyclization of an appropriate 3-(2-acylaminophenyl)indazolesulfonamide.

---

This application is a continuation-in-part of application, Ser. No. 614,793, filed Feb. 9, 1967 by Stanley C. Bell and entitled "Synthesis of Indazolo[2,3-c]Quinazoline-11-Sulfonamides" and now abandoned.

This invention relates to new and novel indazoloquinazoline-sulfonamides as well as to novel methods for their preparation. In particular, the present invention is concerned with indazolo[2,3-c]quinazoline - 11 - sulfonamides having therapeutic activity.

The new and novel compounds which are included within the scope of this invention are represented by the following formula:

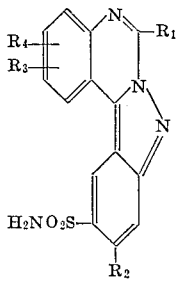

wherein $R_1$ is hydrogen, lower alkyl, and aryl, such as, phenyl and lower alkylphenyl; $R_2$, $R_3$ and $R_4$ are hydrogen, halogen, lower alkoxy and lower alkyl. Typical examples thereof are: 2-chloroindazolo[2,3-c]quinazoline-11-sulfonamide; 2 - chloro-6-methylindazolo[2,3-c]quinazoline - 11-sulfonamide; indazolo[2,3-c]quinazoline-11-sulfonamide; and 3-methyl-6-propylindazolo[2,3-c]quinazoline-11-sulfonamide.

Some of the new and novel indazoloquinazoline sulfonamides of the present invention, in particular, the 6-substituted compounds, may be prepared by one of the processes of this invention which is hereinafter schematically depicted:

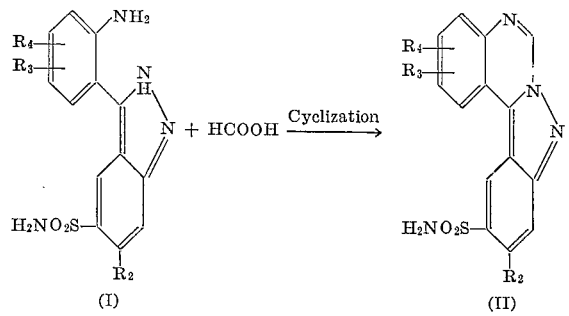

wherein $R_2$, $R_3$ and $R_4$ are defined as above. The reaction is effected by admixing an appropriate 3-(2-aminophenyl)sulfamoylindazole (I) with formic acid and then heating the reaction mixture to a temperature range from about 50° to about reflux temperatures for a period of about one to about ten hours. Preferably, this reaction is conducted at the reflux temperature of the reaction mixture for about two hours.

When the reaction is complete, the mixture is cooled and the precipitated product is separated by filtration to afford the appropriate indazolo[2,3-c]quinazoline-11-sulfonamide (II).

Other of the new and novel indazoloquinazoline sulfonamides of the present invention, in particular, the 6-substituted compounds may be prepared by another process of this invention which is schematically illustrated as follows:

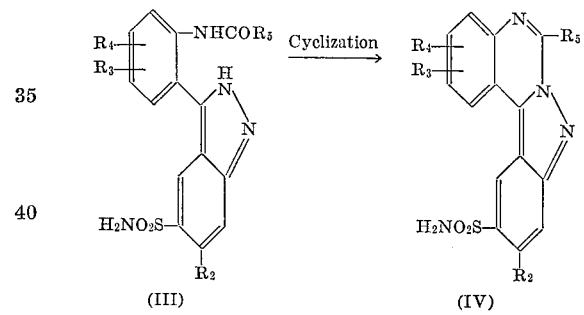

wherein $R_2$, $R_3$ and $R_4$ are defined as above and $R_5$ is selected from the group consisting of lower alkyl, phenyl, and lower alkylphenyl. The cyclization reaction is effected by contacting a 3-(2-acylaminophenyl)indazolesulfonamide (III) with a mineral acid in a reaction-inert solvent. Preferably this invention is conducted with hydrochloric acid in ethanol.

When the reaction is complete, the precipitated product is separated by filtration or decantation to afford the appropriate 6-substituted indazole[2,3-c]quinazoline-11-sulfonamide (IV).

The time and temperature ranges employed in the aforesaid processes are not critical and simply represent the most convenient ranges consistent with carrying out the reaction in a minimum of time without undue difficulty. Thus reaction temperatures appreciably below these can be used bu their use considerably extends the reaction time. Similarly, reaction temperatures higher than those mentioned can be employed with a concomitant decrease in reaction time. By reaction-inert solvent, as employed in the second above described process is meant a liquid which dissolves the reactants and does not prevent their interaction. Among the preferred solvents are alkanols, glycol ethers such as 2-methoxy ethanol, 2-ethoxy ethanol, methoxy and ethoxy propanols, as well as amides such as dimethylformamide. The amount of solvent used is not critical, it being only necessary to use sufficient solvent to provide a reaction medium for the reactants. The mineral acid employed in this later process may be any appropriate inorganic acid, for example, hydrochloric, hydrobromic, sulfuric and phosphoric acid.

The starting compounds employed in the two aforesaid processes, in particular, the 3 - (2-aminophenyl)sulfamoylindazoles (I) and the 3 - (2 - acylaminophenyl) indazolesulfonamides (III) are prepared by the procedures described in copending U.S. patent application, Ser. No. 610,471, entitled "Indazole-5-Sulfonamides," filed on Jan. 20, 1967 by Stanley C. Bell and Carl Gochman. The diacylated and triacylated compounds, e.g. 3 - (2 - diacylaminophenyl)indazolesulfonamides and 2 - acyl - 3 - (2-diacylaminophenyl)indazolesulfonamides described in this copending application also may easily be converted by alkaline hydrolysis to the mono-acylated compounds (III) employed as starting compounds in the second above described process. Specific examples of this hydrolysis are set forth in Examples V and VI. Other alkaline hydrolyzing agents will readily suggest themselves to those skilled in the art of chemistry, e.g. potassium hydroxide.

In accord with the present invention, the new indazolo[2,3 - c]quinazolines herein described have been found to possess interesting pharmaceutical properties which render them useful as synthetic medicinals. More particularly, these compounds, in standard pharmacological tests have exhibited utility as anti-inflammatory agents.

Anti-inflammatory activity of a compound is assessed by its ability to inhibit experimentally-induced edema in the hind paw of the rat. Male Sprague-Dawley rats 120–165 grams are used. Compound is administered intraperitoneally as a solution or suspension in physiological saline (plus 1 drop Tween 80) in a volume of 10 ml./kg. of host weight. Each compound is given to 6 rats and vehicle alone is administered to 6 more rats as a control. Thirty minutes after drug administration edema is induced by an injection of 0.05 ml. of a 1% carrageenin solution in saline into the subplantar tissue of the rat's right hind paw. Paw volume is then immediately measured volumetrically with a plethysmograph and again three hours later. The mean volume of swelling for the control group is calculated and compared to the test groups. Compounds that inhibit swelling approximately 20% as compared to controls are considered active. Inhibition is calculated by the formula:

$$\text{Percent inhibition} = \frac{\text{Mean vol. swelling of control} - \text{mean vol. swelling of test}}{\text{Mean vol. swelling of control}} \times 100$$

When the compounds of this invention are employed a santi-inflammatory agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 25 mg./kg. to about 400 mg. per kg., although as aforementioned variations will occur. However, a dosage level that is in the range of from about 50 mg. to about 150 mg. per kg. is most desirably employed in order to achieve effective results.

The following examples are given by way of illustration and are not to be construed as limitations of this invention, variations of which are possible without departing from the scope and spirit thereof.

EXAMPLE I

A mixture of 2.0 g. of 3-(2-amino-5-chlorophenyl)-5-sulfamoyl-1H-indazole and 60 ml. of formic acid is heated to reflux. After refluxing for two hours, the reaction mixture is cooled and filtered to afford 1.9 g. of 2-chloroindazole[2,3-c]quinazoline-11-sulfonamide, M.P. >300° C.

Analysis.—Calcd. for $C_{14}H_9ClN_4O_2S$ (percent): C, 50.53; H, 2.73; N, 16.84; Cl, 10.65; S, 9.64. Found (percent): C, 50.81; H, 2.45; N, 17.14; Cl, 10.3; S. 9.4.

In a similar manner, reacting 3-(2-aminophenyl)-5-sulfamoyl-1H-indazole with formic acid there is obtained indazolo[2,3-c]quinazoline-11-sulfonamide.

EXAMPLE II

A mixture of 4.0 g. of 3-(2-amino-5-bromophenyl)-6-bromo-5-sulfamoyl-1H-indazole and 120 ml. of formic acid is heated to 75° C. for six hours. Thereafter, the reaction mixture is cooled and the product separated by filtration to afford 2,10-dibromoindazolo[2,3-c]quinazoline-11-sulfonamide.

EXAMPLE III

A mixture of 1.0 g. of 3-(2-amino-5-fluorophenyl)-5-sulfamoyl-1H-indazole and 30 ml. of formic acid is heated to 50° C. for ten hours. Thereafter, the reaction mixture is cooled and the product separated by filtration to afford 2-fluoroindazolo[2,3-c]quinazoline-11-sulfonamide.

In a similar manner, reacting the following sulfamoylindazoles with formic acid the following products are obtained:

| Sulfamoylindazoles | Products |
| --- | --- |
| 3-(2-amino-4-ethylphenyl)-5-sulfamoyl-1H-indazole. | 3-methylindazolo[2,3-c]quinazoline-11-sulfonamide. |
| 3-(2-aminophenyl)-6-methoxy-5-sulfamoyl-1H-indazole. | 10-methoxyindazolo[2,3-c]quinazoline-11-sulfonamide. |
| 3-(2-amino-4,5-dichlorophenyl)-6-methyl-5-sulfamoyl-1H-indazole. | 2,3-dichloro-10-methylindazolo[2,3-c]quinazoline-11-sulfonamide. |
| 3-(2-amino-5-chloro-4-tolyl)-5-sulfamoyl-1H-indazole. | 2-chloro-3-methylindazolo[2,3-c]quinazoline-11-sulfonamide. |
| 3-(2-amino-4-,5-dimethylphenyl)-5-sulfamoyl-1H-indazole. | 2,3-dimethylindazolo[2,3-c]azoline-11-sulfonamide. |

EXAMPLE IV

A mixture of 2.0 g. of 3-(2-amino-5-tolyl)-5-sulfamoyl-1H-indazole and 60 ml. of formic acid is heated to reflux for one hour. Thereafter, the reaction mixture is cooled and the product separated by filtration to afford 2-methylindazolo[2,3-c]quinazoline-11-sulfonamide.

In the same manner, 3-(2-amino-4-methoxyphenyl)-5-sulfamoyl-1H-indazole is reacted with formic acid to produce 3-methoxyindazolo[2,3-c]quinazoline - 11 - sulfonamide.

EXAMPLE V 1.5 g. of 2-acetyl-3-(5-chloro-2-diacetylaminophenyl)-2H-indazole-5-sulfonamide is dissolved in a mixture of ethanol and sodium hydroxide and then acidified with hydrochloric acid. The yellow product that precipitates is collected by filtration. In this manner, there is obtained 2 - chloro - 6 - methylindazolo[2,3-c]quinazoline-11-sulfonamide, M.P. 300° C.

Analysis.—Calcd. for $C_{15}H_{11}ClN_4O_2S \cdot H_2O$ (percent): C, 49.38; H, 3.59; N, 15.36; Cl, 9.72; S, 8.79. Found (percent): C, 49.64; H, 3.51; N, 15.48; Cl, 9.7; S, 8.8.

In a similar manner, 3-(5-methyl-2-dipropionylaminophenyl)-2H-indazole-5-sulfonamide is hydrolyzed with sodium hydroxide and then cyclized with hydrochloric acid to afford 6-ethyl-2-methylindazolo[2,3-c]quinazoline-11-sulfonamide.

EXAMPLE VI 2-butyryl-3-(2-butyrylamino - 4 - methoxyphenyl)-2H-indazole-5-sulfonamide is hydrolyzed with methanolic potassium hydroxide to afford 3-(2-butyrylamino-4-methoxyphenyl)-2H-indazole-5-sulfonamide.

The unisolated above prepared sulfonamide is then contacted with sulfuric acid to obtain 3-methoxy-6-propylindazolo[2,3-c]quinazoline-11-sulfonamide.

Similarly, 3-(2-acetylamino-5-bromophenyl)-6-bromo-2H-indazole-5-sulfonamide is reacted with hydrobromic acid to to afford 2,10-dibromo-6-methylindazolo[2,3-c]quinazoline-11-sulfonamide.

EXAMPLE VII

Repeating the procedure of Examples V and VI to react an appropriate 3-(2-acylaminophenyl)indazolesulfonamide with a mineral acid, the following products are obtained:

10-chloro-6-phenylindazolo[2,3-c]quinazoline-11-sulfonamide;
3-ethyl-6-(4-tolyl)indazolo[2,3-c]quinazoline-11-sulfonamide;
6-phenylindazolo[2,3-c]quinazoline-11-sulfonamide;
6-(4-ethylphenyl)-10-fluoroindazolo[2,3-c]quinazoline-11-sulfonamide;
2-methoxy-6-methylindazolo[2,3-c]quinazoline-11-sulfonamide;
6-ethyl-2-fluoroindazolo[2,3-c]quinazoline-11-sulfonamide;
2,3,6-trimethylindazolo[2,3-c]quinazoline-11-sulfonamide;
6,10-dimethylinadazolo[2,3-c]quinazoline-11-sulfonamide;
2,3-dichloro-10-methoxyindazolo[2,3-c]quinazoline-11-sulfonamide; and
10-ethylindazolo[2,3-c]quinazoline-11-sulfonamide.

What is claimed is:

1. A compound selected from the group consisting of those having the formula:

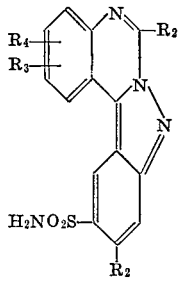

wherein $R_1$ is selected from the group consisting of hydrogen, lower alkyl, phenyl and lower alkylphenyl; and $R_2$, $R_3$ and $R_4$ are selected from the group consisting of hydrogen, halogen, lower alkyl and lower alkoxy.

2. A compound as described in claim 1 which is: 2-chloroindazole[2,3-c]quinazoline-11-sulfonamide.

3. A compound as described in claim 1 which is: 2-chloro-6-methylindazolo[2,3-c]quinazoline - 11 - sulfonamide.

4. A compound as described in claim 1 which is: indazolo[2,3-c]quinazoline-11-sulfonamide.

5. A compound as described in claim 1 which is: 2-methylindazolo[2,3-c]quinazoline-11-sulfonamide.

6. A compound as described in claim 1 which is: 6 - ethyl-2-methylindazolo[2,3-c]quinazoline-11-sulfonamide.

7. A process for the preparation of compounds having the formula:

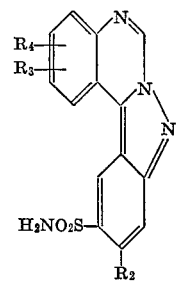

wherein $R_2$, $R_3$ and $R_4$ are selected from the group consisting of hydrogen, halogen, lower alkyl and lower alkoxy which comprises reacting a 3-(2-aminophenyl) sulfamoylindazole of the formula:

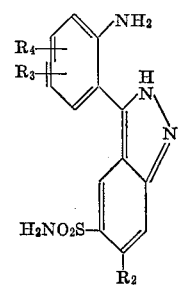

wherein $R_2$, $R_3$ and $R_4$ are defined as above; with formic acid at a temperature range from about 50° C. to about the reflux temperature of the reaction mixture for a period of about one to above ten hours.

8. A process as described in claim 7 wherein the reaction is conducted at the reflux temperature of the reaction mixture.

9. A process for the preparation of compounds having the formula:

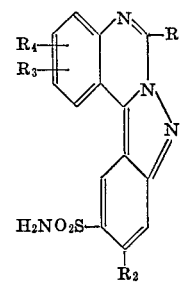

wherein $R_2$, $R_3$ and $R_4$ are selected from the group consisting of hydrogen, halogen, lower alkyl and lower alkoxy; and $R_5$ is selected from the group consisting of lower alkyl, phenyl and lower alkylphenyl; which comprises reacting a 3-(2-acylaminophenyl)indazolesulfonamide of the formula:

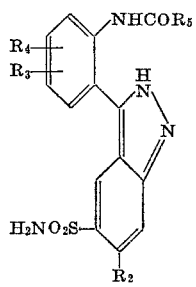

wherein $R_2$, $R_3$, $R_4$ and $R_5$ are defined as above with a mineral acid in a reaction-inert solvent.

10. A process as described in claim 9 wherein the mineral acid is hydrochloric acid and the reaction-inert solvent is ethanol.

References Cited

FOREIGN PATENTS 1,467,734  12/1966  France.

ALEX MAZEL, Primary Examiner

R. J. GALLAGHER, Assistant Examiner

U.S. Cl. X.R.

424—251; 260—310